(12) United States Patent
Beale

(10) Patent No.: US 8,585,070 B2
(45) Date of Patent: Nov. 19, 2013

(54) SHOCK-ABSORBING BICYCLE FRAME HAVING TWO FLEXIBLE MEMBERS

(75) Inventor: Luke Beale, Portland, OR (US)

(73) Assignee: A-Pro Tech Co., Ltd., Taichung (TW)

( * ) Notice: Subject to any disclaimer, the term of this patent is extended or adjusted under 35 U.S.C. 154(b) by 10 days.

(21) Appl. No.: 13/596,359

(22) Filed: Aug. 28, 2012

(65) Prior Publication Data

US 2013/0214508 A1 Aug. 22, 2013

(30) Foreign Application Priority Data

Feb. 16, 2012 (TW) .............................. 101202825 A

(51) Int. Cl.
*B62K 25/28* (2006.01)
*B62K 25/04* (2006.01)

(52) U.S. Cl.
USPC ........................................................ 280/284

(58) Field of Classification Search
USPC ................................ 280/124.1, 275, 276, 284
See application file for complete search history.

(56) References Cited

U.S. PATENT DOCUMENTS

| 618,627 | A | * | 1/1899 | Travis | 280/284 |
| 621,942 | A | * | 3/1899 | Pierce | 280/276 |
| 1,029,771 | A | * | 6/1912 | Stephenson | 280/284 |
| 2,132,317 | A | * | 10/1938 | Pease | 280/284 |
| 5,586,780 | A | * | 12/1996 | Klein et al. | 280/275 |
| 6,092,823 | A | * | 7/2000 | Busby | 280/284 |
| 2010/0207342 | A1 | * | 8/2010 | Weagle | 280/124.1 |
| 2011/0018228 | A1 | * | 1/2011 | Beale et al. | 280/284 |
| 2011/0193316 | A1 | * | 8/2011 | Earle | 280/284 |

* cited by examiner

*Primary Examiner* — Tashiana Adams
*Assistant Examiner* — Daniel Yeagley
(74) *Attorney, Agent, or Firm* — Morgan, Lewis & Bockius LLP

(57) ABSTRACT

A shock-absorbing bicycle frame includes a front frame, a rear frame, and a shock-absorbing unit. The rear frame includes a seat stay and a chain stay interconnected to form an angle therebetween. The shock-absorbing unit includes a first flexible member connected removably to the chain stay and the front frame, and a second flexible member connected between the chain stay and the front frame and disposed directly above the first flexible member. The first and second flexible members are deformable in first and second directions, respectively. The first direction intersects the second direction. As such, when subjected to an external force, the first and second flexible members are deformed to absorb shock.

10 Claims, 3 Drawing Sheets

US 8,585,070 B2

SHOCK-ABSORBING BICYCLE FRAME HAVING TWO FLEXIBLE MEMBERS

CROSS-REFERENCE TO RELATED APPLICATION

This application claims priority of Taiwanese Application No. 101202825 filed on Feb. 16, 2012.

BACKGROUND OF THE INVENTION

1. Field of the Invention

This invention relates to a bicycle frame, and more particularly to a shock-absorbing bicycle frame having two flexible members.

2. Description of the Related Art

Referring to FIG. 1, a conventional shock-absorbing bicycle frame 1 includes a front frame 11, a rear frame 12, and a shock absorber 13. The front frame 11 includes a top tube 111, a down tube 112 connected to the top tube 111, a seat tube 113 connected to rear ends of the top tube 111 and the down tube 112, a head tube 114 connected to front ends of the top tube 111 and the down tube 112, and a bottom bracket 115 connected to the seat tube 113 and the down tube 112. The rear frame 12 includes a chain stay 121 connected pivotally to the bottom bracket 115 by a pivot shaft unit (A), and a seat stay 122 connected to the chain stay 121 and the seat tube 113. The shock absorber 13 is disposed between the seat stay 122 and the seat tube 113.

When the bicycle frame 1 is subjected to a force, the front frame 11 or the rear frame 12 pivots about the pivot shaft unit (A), and the pivoting movement of the front frame 11 or the rear frame 12 is retarded by the shock absorber13 to achieve the shock absorption effect. Due to the presence of the pivot shaft unit (A), the total weight of the conventional shock-absorbing bicycle frame is increased to thereby result in a reduction in the performance of the bicycle.

SUMMARY OF THE INVENTION

The object of this invention is to provide a shock-absorbing bicycle frame that is lightweight and that can provide comfort to the rider during riding.

According to this invention, a shock-absorbing bicycle frame comprises:
a front frame;
a rear frame including a seat stay and a chain stay that are interconnected to form an angle therebetween, the seat stay being connected to the front frame, the chain stay being spaced apart from the front frame by a horizontal distance; and
a shock-absorbing unit including a first flexible member connected removably to the chain stay and the front frame, and at least one second flexible member connected between the chain stay and the front frame and disposed directly above the first flexible member, the first and second flexible members being deformable within a space between the chain stay and the front frame in a first direction and a second direction, respectively, wherein the first direction intersects the second direction.

As such, shock can be absorbed through deformation of the first and second flexible members. Further, no pivot shaft unit is disposed on the chain stay, thereby reducing the total weight of the bicycle frame.

BRIEF DESCRIPTION OF THE DRAWINGS

These and other features and advantages of this invention will become apparent in the following detailed description of a preferred embodiment of this invention, with reference to the accompanying drawings, in which.

DETAILED DESCRIPTION OF THE PREFERRED EMBODIMENT

Figure 2:
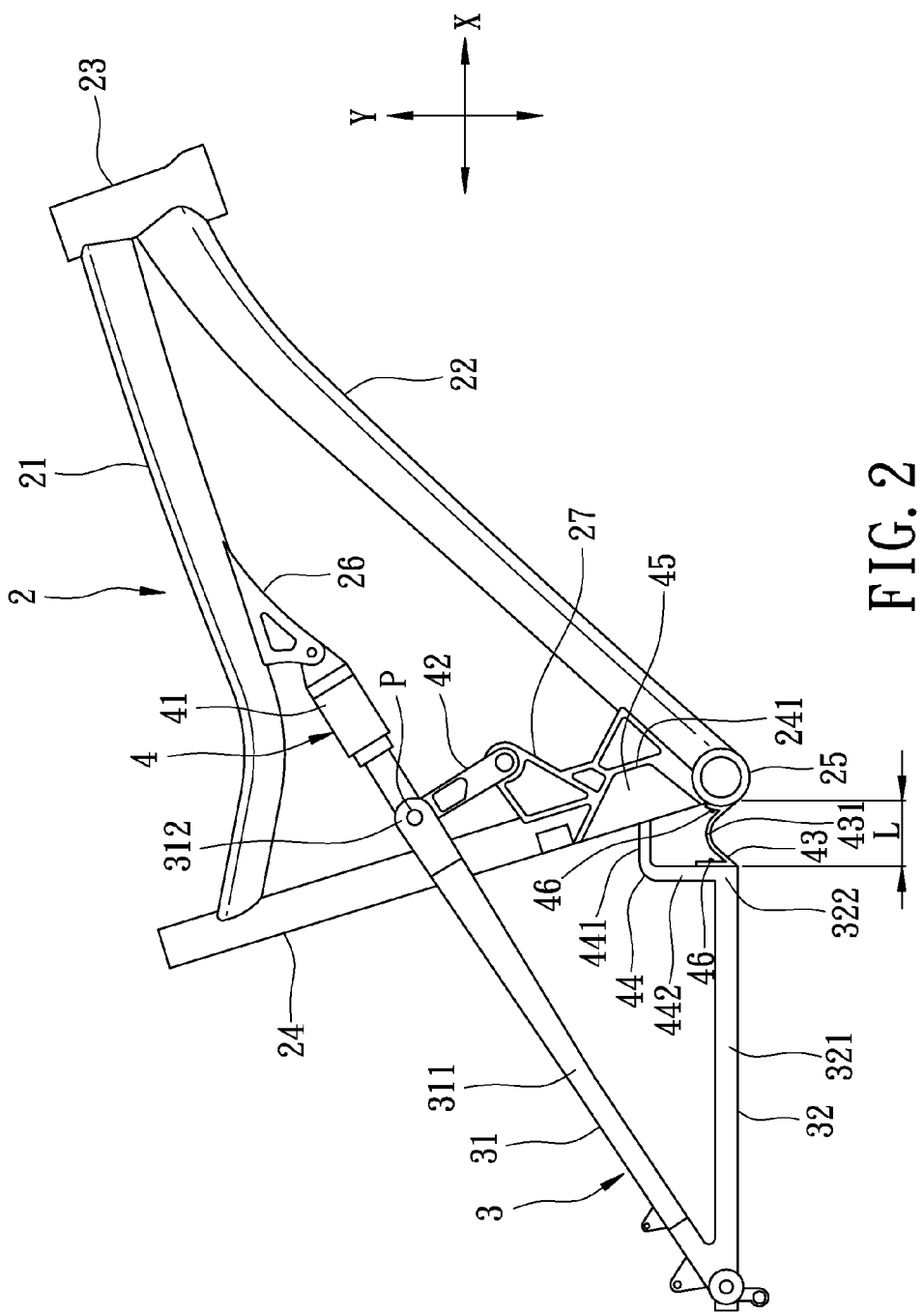
FIG. 2 is a side view of the preferred embodiment of a shock-absorbing bicycle frame according to this invention.
Figure 3:
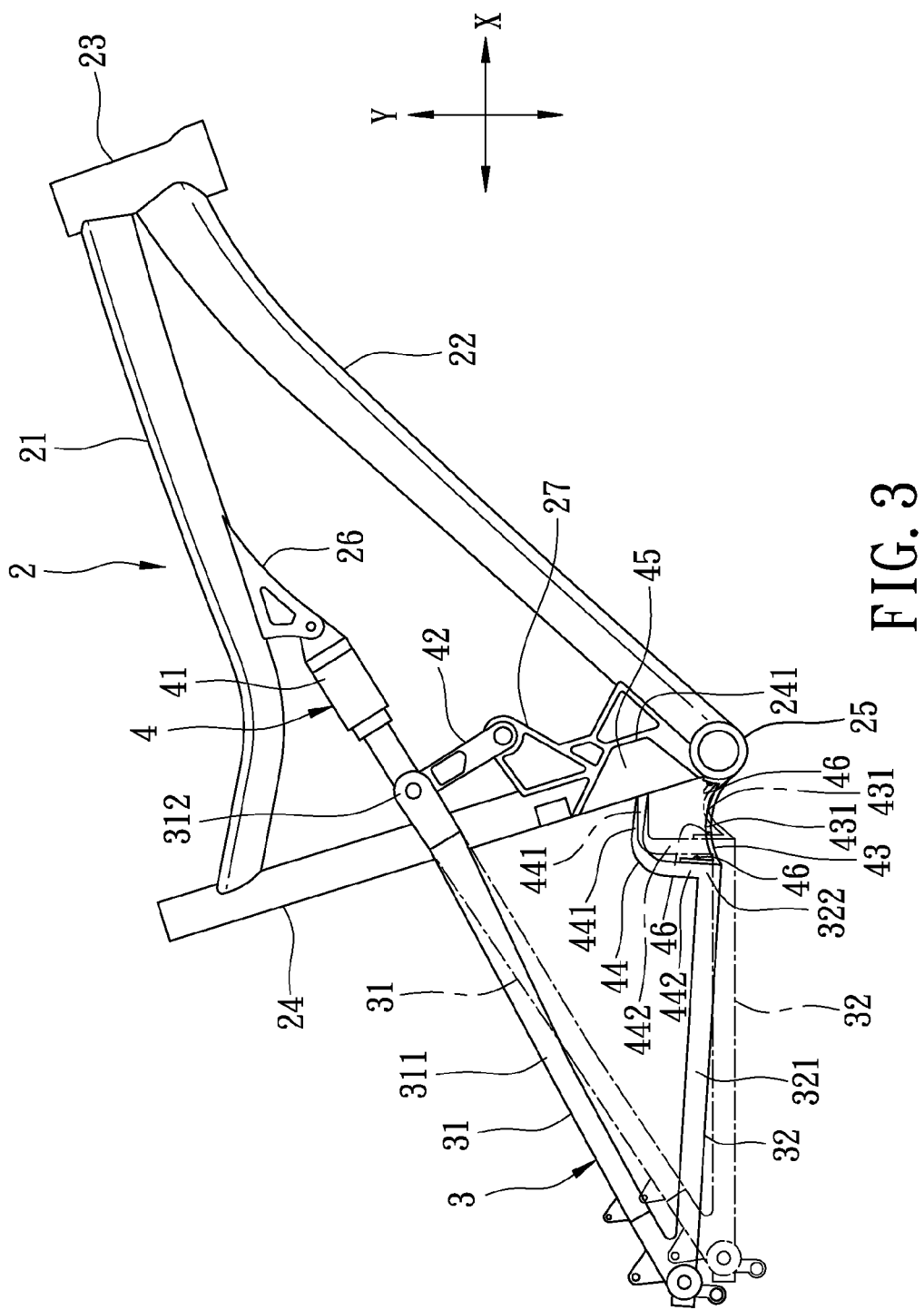
FIG. 3 is a schematic side view of the preferred embodiment, illustrating deformation of first and second flexible members.

Referring to FIGS. 2 and 3, the preferred embodiment of a shock-absorbing bicycle frame according to this invention includes a front frame 2, a rear frame 3, and a shock-absorbing unit 4.

The front frame 2 includes a top tube 21, a down tube 22, a head tube 23 connected to front ends of the top tube 21 and the down tube 22, a seat tube 24 connected to a rear end of the top tube 21, a bottom bracket 25 connected to a lower end of the seat tube 24 and a rear end of the down tube 22, a first connecting member 26 connected fixedly to the top tube 21 and extending from the top tube 21 toward the down tube 22, and a second connecting member 27 disposed fixedly on and in front of the seat tube 24 and extending from the seat tube 24 toward the head tube 23. The seat tube 24 is formed with an insert groove 241 adjacent to the bottom bracket 25.

The rear frame 3 includes a seat stay 31 and a chain stay 32. In this embodiment, the seat stay 31 is Y-shaped, and has two upper fork rods 311 disposed respectively at two sides of the seat tube 24, and a front end section 312 disposed between the top tube 21 and the down tube 22 and having a lower end connected to a junction between the upper fork rods 311. The chain stay 32 has two lower fork rods 321 connected respectively to the upper fork rods 311 and forming an angle therebetween, and a front end section 322 having a rear end connected to a junction between the lower fork rods 321. The front end section 322 is spaced apart from the bottom bracket 25 by a horizontal distance (L). The shock-absorbing unit 4 includes a shock absorber 41, two link rods 42, a first flexible member 43, a second flexible member 44, and an insert plate 45. The shock absorber 41 is connected pivotally to and disposed between the front end section 312 of the seat stay 31 and the first connecting member 26. The link rods 42 are connected pivotally to and disposed between the second connecting member 27 and a junction between the shock absorber 41 and the front end section 312 of the seat stay 31, in such a manner that the shock absorber 41, the seat stay 31, and the link rods 42 are pivotable about a pivot point (P). The first flexible member 43 is curved, and is made of a carbon fiber material. In this embodiment, the first flexible member 43 is connected removably to the front end section 322 of the chain stay 32 and the bottom bracket 25 of the front frame 2, and has a curved convex portion 431 that is convexed toward the second flexible member 44 and that is deformable within a space between the front end section 322 of the chain stay 32 and the bottom bracket 25 in a first direction (Y). In this embodiment, two lock bolts 46 extend respectively through two opposite ends of the first flexible member 43 for locking the same on the bottom bracket 25 and the chain stay 32. Alternatively, the first flexible member 43 may be connected to the bottom bracket 25 and the chain stay 32 by tongue-and-groove engagements, snap fittings, or pivotal connections. The second flexible member 44 is also made of a carbon fiber material, and has an supporting arm 441 having a rear end located directly above a front end of the chain stay 32, and a swing arm 442 connected integrally between the rear end of the supporting arm 441 and the front end section 322 of the chain stay 32 and deformable within a space between the front end section 322 of the chain stay 32 and the bottom bracket 25 in a second direction (X). The insert plate 45 is connected fixedly to a front end of the supporting arm 441 and inserted into the insert groove 241 in the seat tube 24. It should be noted that, the first direction (Y) intersects the second direction (X).

Since the chain stay 32 and the front frame 2 do not have any pivot shaft unit disposed therebetween, and constitute a rigid construction, when the front and rear frames 2, 3 are subjected to an external force, the curved convex portion 431 of the first flexible member 43 is deformed in the first direction (Y), and the swing arm 441 of the second flexible member 44 is deformed in the second direction (X). Hence, the chain stay 32 is pivoted upwardly relative to the supporting arm 441 to thereby activate the shock absorber 4, so as to achieve the shock absorbing effect, thus reducing the vibration amplitude of the front and rear frames 2, 3 and facilitating steady control of the bicycle. Consequently, the shock-absorbing bicycle frame of this invention is applicable to All Terrain Vehicles.

Figure 1:
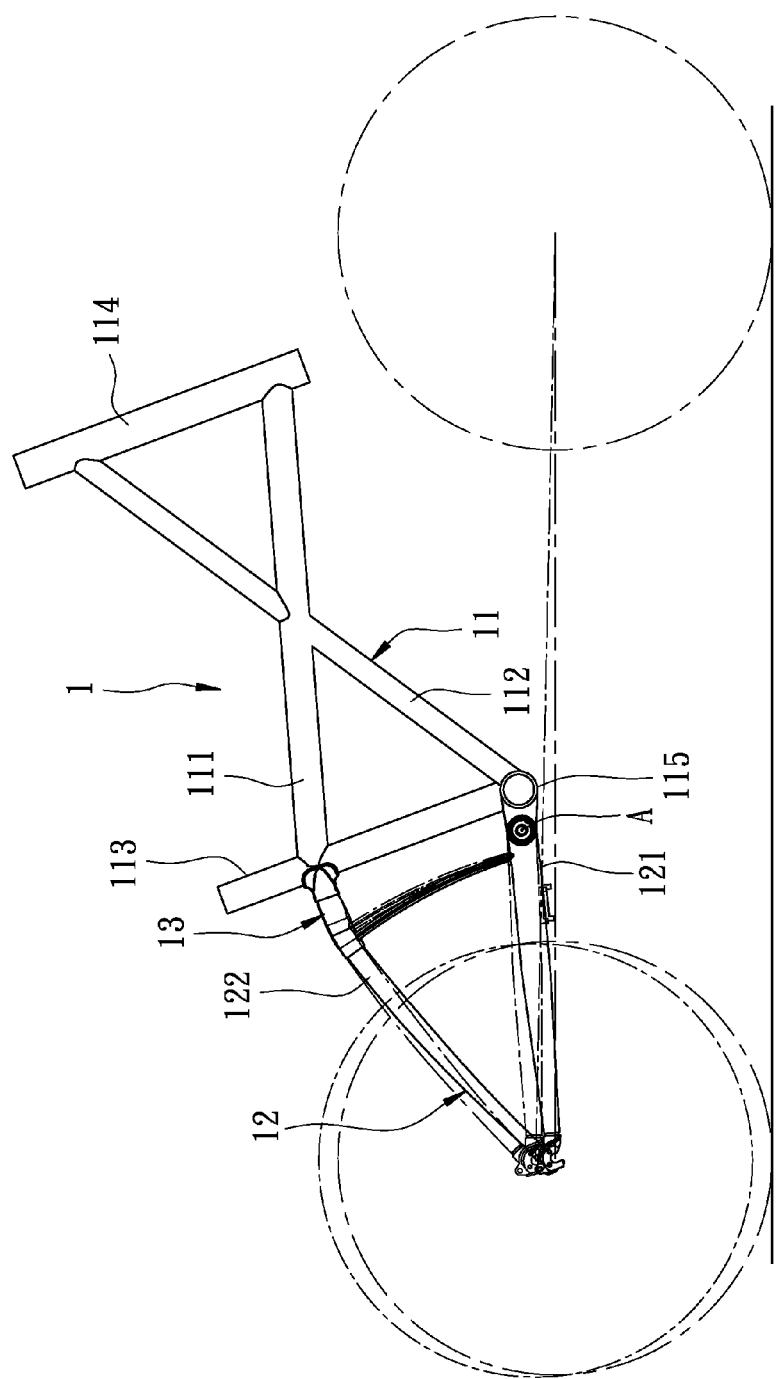
FIG. 1 is a side view of a conventional shock-absorbing bicycle frame.

To summarize, the shock-absorbing bicycle frame of this invention has the following advantages:

Due to the presence of the first and second flexible members 43, 44 constituting a rigid construction, the rigidity of the front and rear frames 2, 3 is promoted. Furthermore, the first and second flexible members 43, 44 cooperate with the shock absorber 4 to reduce the vibration amplitude of the front and rear frames 2, 3 to thereby increase the shock-absorbing effect. Further, since the chain stay 32 does not have any pivot shaft unit (A) (see FIG. 1) required for the above-mentioned prior art, the total weight of the bicycle frame can be reduced.

More importantly, by replacing the first flexible member 43, the shock-absorbing characteristics of the shock-absorbing unit 4 can be changed according to the needs of the rider.

It should be noted that, the shock-absorbing unit 4 may include a plurality of second flexible members 44.

With this invention thus explained, it is apparent that numerous modifications and variations can be made without departing from the scope and spirit of this invention. It is therefore intended that this invention be limited only as indicated by the appended claims.

I claim:

1. A shock-absorbing bicycle frame comprising:
   a front frame;
   a rear frame including a seat stay and a chain stay that are interconnected, said seat stay being connected pivotally to said front frame, said chain stay being spaced apart from said front frame by a horizontal distance; and
   a shock-absorbing unit including a first flexible member connected removably to said chain stay and said front frame, and at least one second flexible member connected between said chain stay and said front frame and disposed directly above said first flexible member, said first and second flexible members being deformable within a space between said chain stay and said front frame in a first direction and a second direction, respectively, said first direction intersecting said second direction;
   wherein said first and second flexible members are connected to said front frame at two positions of said front frame, respectively, and are connected to said rear frame at two positions of said chain stay, a distance between said two positions of said front frame being longer than that between said two positions of said chain stay.

2. The shock-absorbing bicycle frame as claimed in claim 1, wherein said front frame is connected pivotally to said seat stay of said rear frame through a link rod.

3. The shock-absorbing bicycle frame as claimed in claim 1, wherein said first flexible member is curved, and has a curved convex portion that is convexed toward said second flexible member and that is deformable in said first direction.

4. The shock-absorbing bicycle frame as claimed in claim 1, wherein said second flexible member includes a supporting arm connected to said front frame, and a swing arm connected between said supporting arm and said chain stay and deformable in said second direction.

5. The shock-absorbing bicycle frame as claimed in claim 4, wherein said front frame has an insert groove, said supporting arm has a front end, said second flexible member further includes an insert plate connected fixedly to said front end of said supporting arm and adapted to be inserted into the insert groove in the front frame.

6. The shock-absorbing bicycle frame as claimed in claim 1, wherein said front frame includes a top tube, a down tube, a head tube connected to front ends of said top tube and said down tube, a seat tube connected to a rear end of said top tube, and a bottom bracket connected to a lower end of said seat tube, a rear end of said down tube, and said first flexible member, said seat tube being formed with an insert groove.

7. The shock-absorbing bicycle frame as claimed in claim 6, wherein said front frame further includes a first connecting member connected fixedly to one of said top tube and said down tube and disposed between said top tube and down tube, said shock-absorbing unit including a shock absorber disposed between and connected pivotally to said seat stay and said first connecting member.

8. The shock-absorbing bicycle frame as claimed in claim 7, wherein said front frame further includes a second connecting member disposed fixedly on and in front of said seat tube, and said first connecting member is connected fixedly to said top tube, said shock-absorbing unit further including at least one link rod disposed between and connected pivotally to said second connecting member and a junction between said seat stay and said shock absorber, such that said shock absorber, said seat stay, and said link rod are pivotable about a pivot point.

9. The shock-absorbing bicycle frame as claimed in claim 1, wherein said first and second flexible members are made of a carbon fiber material.

10. The shock-absorbing bicycle frame as claimed in claim 1, wherein said first and second flexible members define a space therebetween, within which nothing is disposed.

* * * * *